(12) United States Patent
Tabrizi et al.

(10) Patent No.: US 9,037,147 B2
(45) Date of Patent: *May 19, 2015

(54) NETWORK CONTROLLED TETHERING OF WIRELESS DEVICES

(75) Inventors: Haleh Tabrizi, Stanford, CA (US); Golnaz Farhadi, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 314 days.

This patent is subject to a terminal disclaimer.

(21) Appl. No.: 13/619,924

(22) Filed: Sep. 14, 2012

(65) Prior Publication Data

US 2014/0080533 A1    Mar. 20, 2014

(51) Int. Cl.
*H04W 72/08* (2009.01)
*H04W 72/00* (2009.01)
*H04W 88/04* (2009.01)
*H04W 84/18* (2009.01)

(52) U.S. Cl.
CPC .............. *H04W 72/08* (2013.01); *H04W 84/18* (2013.01); *H04W 88/04* (2013.01)

(58) Field of Classification Search
CPC ........................... H04W 72/08; H04W 28/0268
USPC .......... 455/509, 513, 452.1, 3.01, 414.1, 458, 455/67.11, 517, 452.2, 69, 515, 41.2, 455/67.13; 370/331, 329
See application file for complete search history.

(56) References Cited

U.S. PATENT DOCUMENTS

2013/0208701 A1* 8/2013 Cho et al. ....................... 370/331
2013/0215860 A1* 8/2013 Cho et al. ....................... 370/329
2013/0301552 A1* 11/2013 Xu et al. ........................ 370/329

FOREIGN PATENT DOCUMENTS

KR    2011-0107108 A    9/2011
WO    2012/053844 A2    4/2012

OTHER PUBLICATIONS

Extended European Search Report for European Application No. 13183645.4, mailed Jan. 31, 2014.
3GPP TS 36.300, Evolved Universal Terrestrial Radio Access (E-UTRA) and Evolved Universal Terrestrial Radio Access Network (E-UTRAN); Overall description; Stage 2. Jun. 2012.
3GPP TR 36.814, Evolved Universal Terrestrial Radio Access (E-UTRA); Further advancements for E-UTRA physical layer aspects, Mar. 2010.

(Continued)

*Primary Examiner* — John J Lee
(74) *Attorney, Agent, or Firm* — Maschoff Brennan

(57) ABSTRACT

A method for tethering wireless devices includes assigning, by a wireless communication network access point, a master wireless device as a hotspot to provide communication services for a slave wireless device. The assignment may be based on first channel quality information and second channel quality information. The first channel quality information may be associated with a first communication channel between the master wireless device and the access point. The second channel quality information may be associated with a second communication channel between the master wireless device and the slave wireless device. The method may also include allocating a wireless communication resource to the master wireless device such that the master wireless device is configured as the hotspot. The allocation of the communication resource may be based on a determination that a parameter requirement of the communication resource associated with the master wireless device acting as the hotspot is met.

23 Claims, 7 Drawing Sheets

(56) References Cited

OTHER PUBLICATIONS

FCC 10-174 Federal Communications Commission, "Second Memorandum Opinion and Order", Sep. 2010.
IEEE P802.11af/D1.06, DRAFT Standard for Information Technology, "Part 11: Wireless LAN Medium Access Control (MAC) and Physical Layer (PHY) specifications—Amendment 5: TV White Spaces Operation", Mar. 2012.
3GPP TS 36.331, Evolved Universal Terrestrial Radio Access (E-UTRA); Radio Resource Control (RRC); Protocol specification, Jul. 2012.
3GPP TS 36.213 v10.6.0, Evolved Universal Terrestrial Radio Access (E-UTRA); Physical layer procedures (Release 10), Jun. 2012.
3GPP TR 36.808, Evolved Universal Terrestrial Radio Access (E-UTRA); Carrier Aggregation; Base Station (BS) radio transmission and reception (Release 10), Jun. 2012.
3GPP TR ab.cde v0.3.0, Inter-band Carrier Aggregation Technical Report (Release 11), May 2012.
3GPP TS 22.011 v11.2.0, Technical Specification Group Services and System Aspects; Service accessibility (Release 11), Dec. 2011.
Doppler et al., "Device-to-Device communication as an Underlay to LTE-Advanced Networks", IEEE Communications magazine, p. 42-49, Dec. 2009.
3GPP TS 36.211 v10.5.0, Evolved Universal Terrestrial Radio Access (E-UTRA); Physical channels and modulation (Release 10), Jun. 2012.
Borth et al.,"Considerations for successful cognitive radio systems in us tv white space," New Frontiers in Dynamic Spectrum Access Networks, DySPAN 2008. 3rd IEEE Symposium on, pp. 1-5, Oct. 2008.
Cordeiro et al., "IEEE 802.22: the first worldwide wireless standard based on cognitive radios," New Frontiers in Dynamic Spectrum Access Networks, DySPAN 2005. 2005 First IEEE International Symposium on, pp. 328-337, Nov. 2005.
Paramvir et al., "White space networking with wi-fi like connectivity," SIGCOMM '09 Proceedings of the ACM SIGCOMM 2009 conference on Data communication, vol. 39, No. 4, pp. 27-38, Oct. 2009.
Murty et al., "Senseless: A database-driven white spaces network," Mobile Computing, IEEE Transactions on, vol. 11, No. 2, pp. 189-203, Feb. 2012.
CISCO Connected Stadium Wi-Fi, "Connecting fans in new ways to deliver the ultimate fan experience", Cisco Systems Inc., Jul. 2011 <www.cisco.com/web/strategy/docs/sports>.
BelAir Networks, "Stadium Wi-Fi: Designing and deploying wi-fi in high capacity, high interference venues", Sep. 2012, <www.belairnetworks.com/sites/default/files/WP-stadium-Wi-Fi.pdf>.
Ruckus Wireless, "Deutch telekom installs state-of-the-art 802.11n wi-fi system in one of Germany's largest stadiums", Jan. 2010, <www.ruckuswireless.com/press/releases>.
Goldman, "Why no one got a wi-fi connection at mobile world congress", CNN Money, Feb. 2011, <www.money.cnn.com/2011_02_18/technology/mwc-wifi>.
Zhao et al., "Cellular CDMA capacity with out-of-band multihop relaying," Mobile Computing, IEEE Transactions on, vol. 5, No. 2, pp. 170-178, Feb. 2006.
Strategic Technologies STRP-10, "High Density Wireless Access—Coverage for Crowded Events and Locations", Full Research Proposal Application Form—The Long-Term Comprehensive National Plan for Science, Technology and Innovation, Sep. 2012.
T. Todd and D. Zhao, "Cellular cdma capacity in hotspots with limited ad hoc relaying," Proc. 14th IEEE Intl Symp. Personal, Indoor, and Mobile Radio Comm. (PIMRC2003), pp. 2828-2832, Sep. 2003.

* cited by examiner

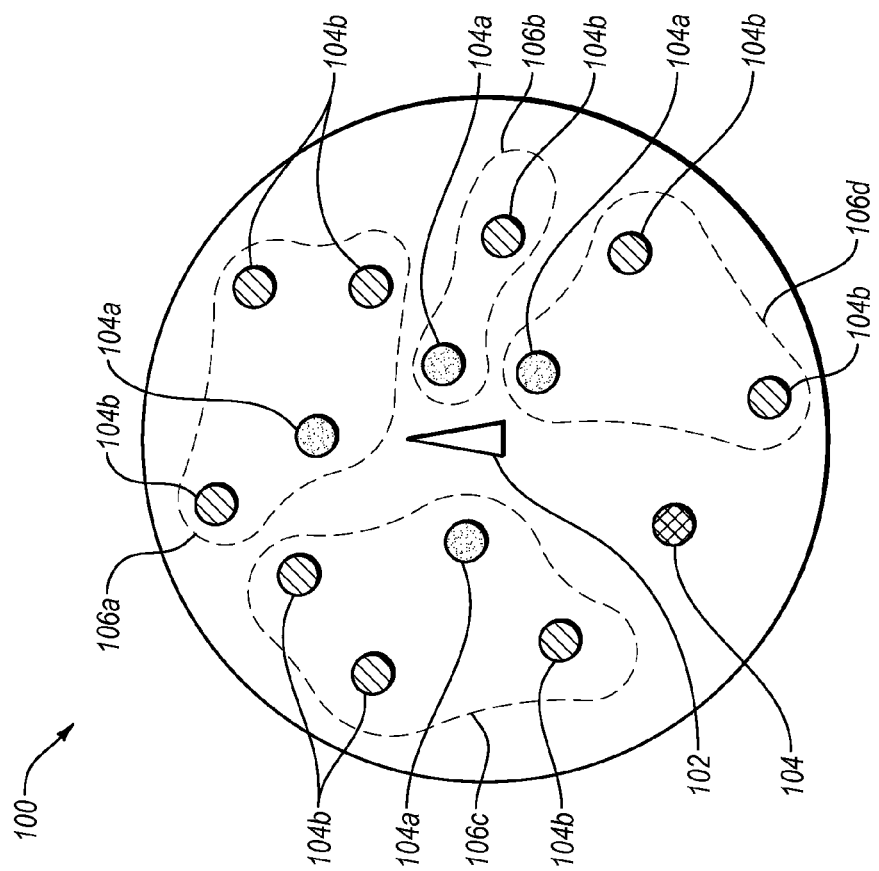
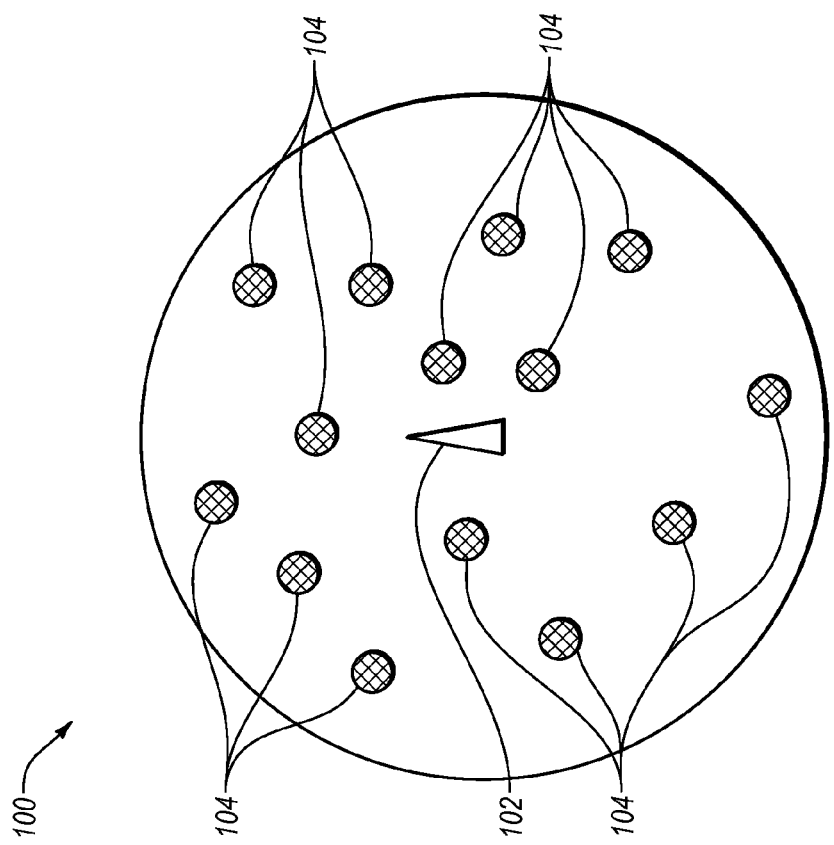

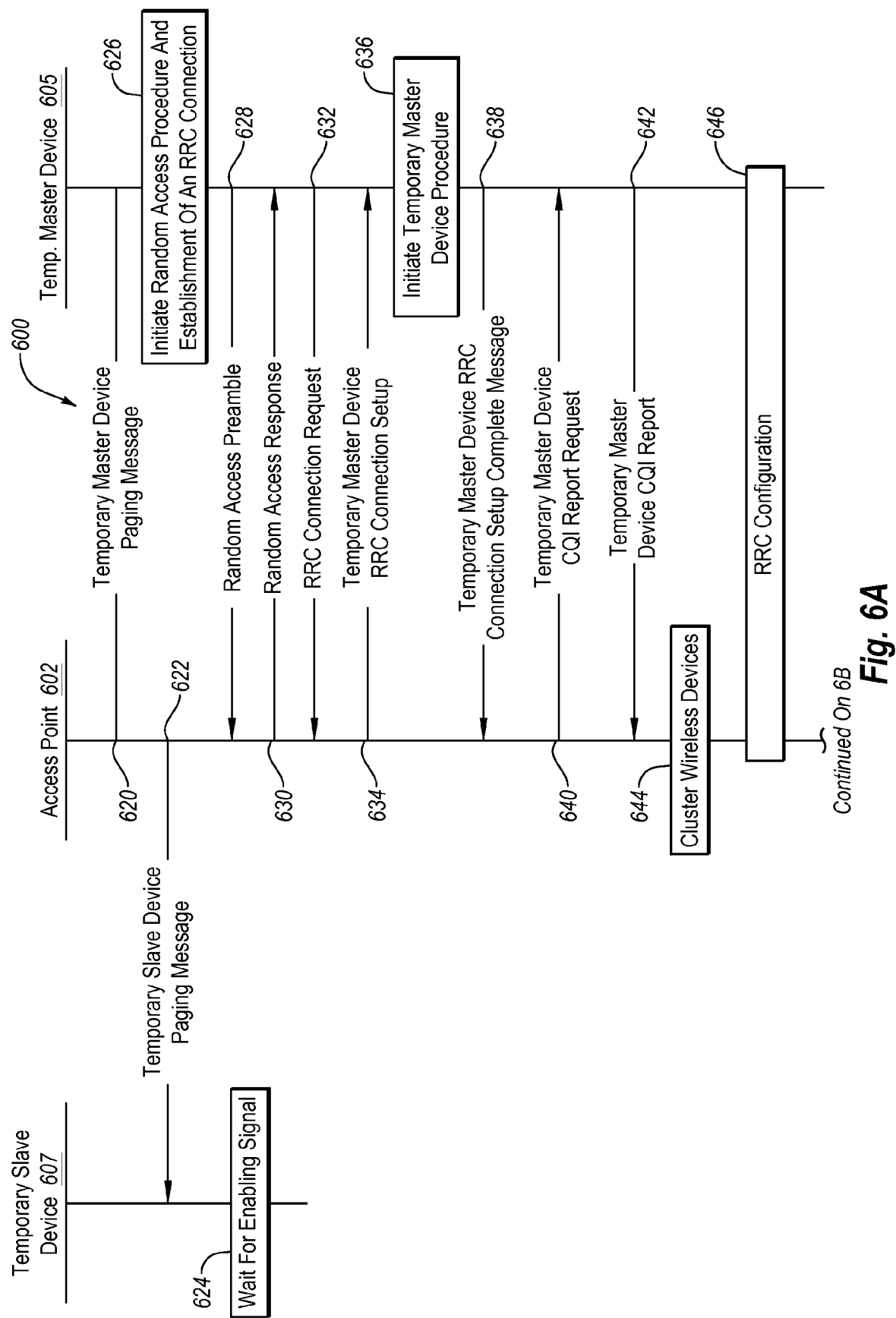

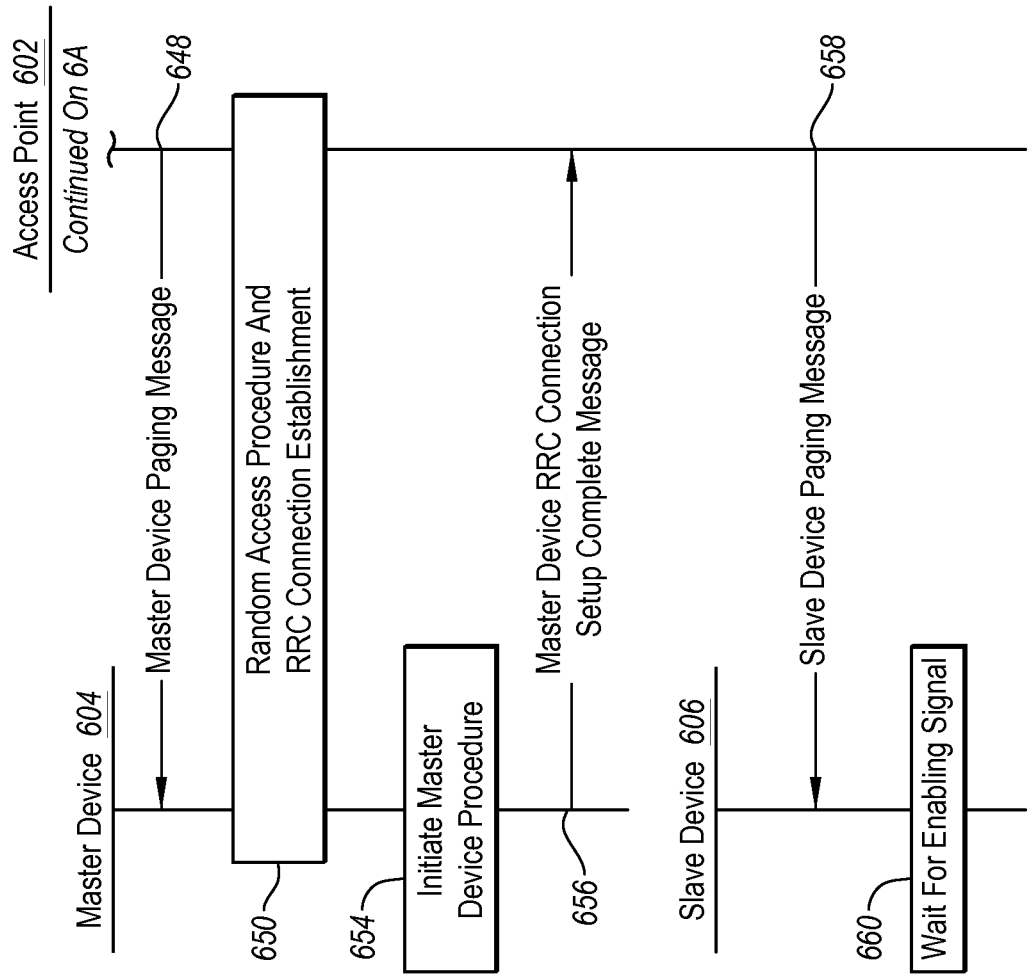

NETWORK CONTROLLED TETHERING OF WIRELESS DEVICES

FIELD

The present disclosure relates to network controlled tethering of wireless devices.

BACKGROUND

The proliferation of smartphones, tablets, laptop computers and other electronic devices (referred to generally as "wireless devices") that use wireless communication networks has created an increasing demand for ubiquitous and continuous wireless voice and data access. This demand may be compounded when large crowds gather in relatively small areas (referred to as "venues"). Examples of such venues include sports stadiums, concert halls, and conferences and trade shows.

Further, machine-to-machine (M2M) communication and Home Area Networks (HAN) are relatively new paradigms that are growing rapidly and include scenarios of dense wireless communications. For example, M2M communication may be performed between a relatively large number of wireless devices in a relatively small area and allows machines or systems to capture information and communicate the information with each other for informing others, analyzing, and/or storing data. As another example, HAN, is a type of residential local area network that connects wireless devices within a home. With an increasing number of wireless devices within a home, the home environment can be thought of as a dense wireless area.

In some instances, an increase in use of wireless data applications on wireless devices in such venues, M2M networks, and/or HAN's may over-burden the capabilities of existing wireless communication networks that provide wireless data service for the venues, M2M networks, and/or HAN's. Additionally, performance of wireless devices at the service edges of wireless communication access points may be degraded due to reduced signal strengths at the edges.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method for tethering wireless devices includes assigning, by a wireless communication network access point, a master wireless device as a hotspot to provide communication services for a slave wireless device. The assignment may be based on first channel quality information and second channel quality information. The first channel quality information may be associated with a first communication channel between the master wireless device and the wireless communication access point. The second channel quality information may be associated with a second communication channel between the master wireless device and the slave wireless device. The method may also include allocating a wireless communication resource to the master wireless device such that the master wireless device is configured as the hotspot for the slave wireless device. The allocation of the wireless communication resource may be based on a determination that a parameter requirement of the wireless communication resource associated with the master wireless device acting as the hotspot for the slave wireless device is met.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A illustrates an example wireless communication network configured to perform tethering of wireless devices;

FIG. 1B illustrates an example of clustering wireless devices that may be performed within the wireless communication network of FIG. 1A;

FIGS. 6A and 6B illustrate an example signaling mechanism for reducing random access channel congestion.

DESCRIPTION OF EMBODIMENTS

Figure 2:
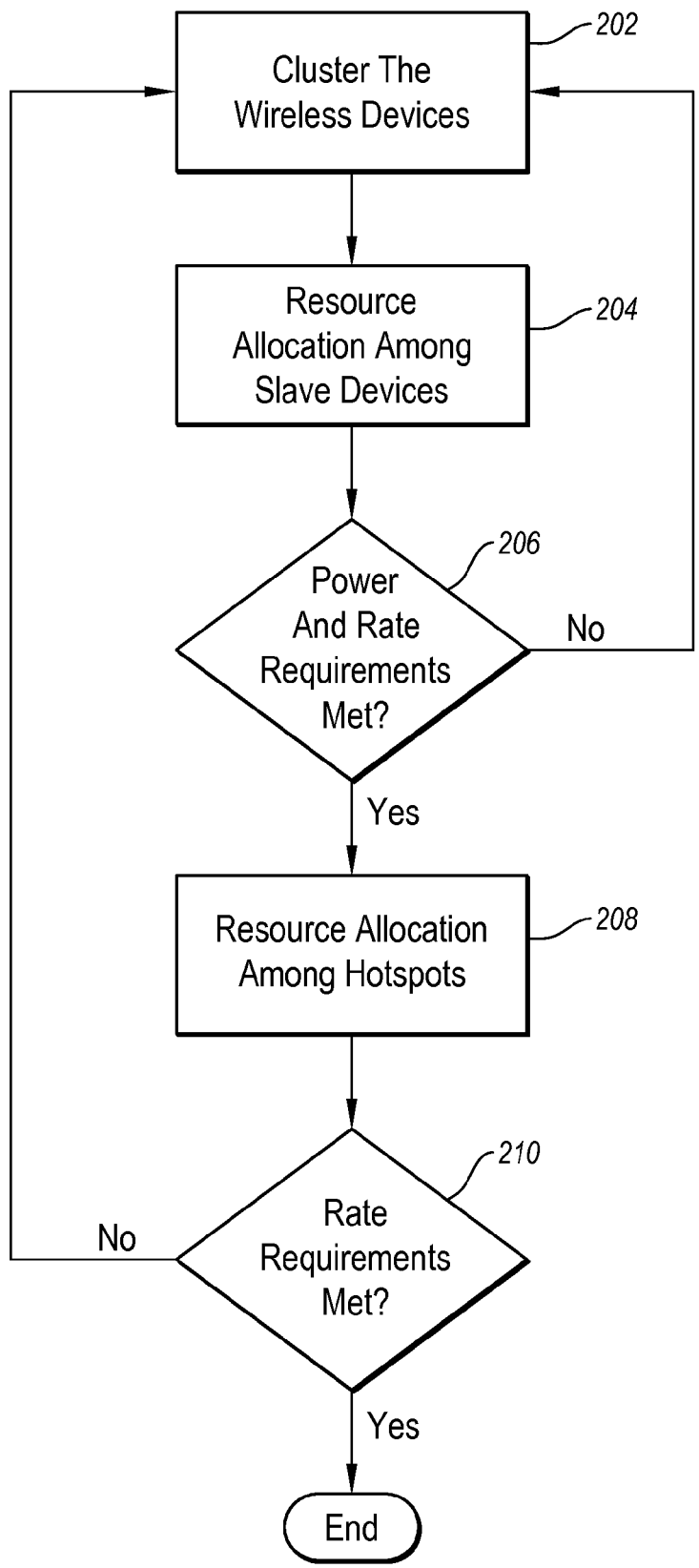
FIG. 2 is a flow chart of an example method for network controlled tethering of wireless devices.

In particular embodiments and as described in further detail below, one or more wireless devices operating on a wireless communication network may be designated and configured as a master wireless device. Similarly, one or more other wireless devices operating on the wireless communication network may be designated and configured as a slave wireless device. The master wireless device may act as a hotspot to provide wireless service to the slave wireless device such that the master wireless device and the slave wireless device are grouped as a cluster. The master wireless device may act as a hotspot via a communication channel between the master wireless device and a wireless communication access point (e.g., a base station, a remote radio head, etc. and referred to hereinafter as an "access point"). The master wireless device acting as a hotspot allows the access point to communicate directly with the master wireless device and use the communication channel between the master wireless device and the access point as a wireless back-haul for the slave wireless devices. The designation of the wireless devices as masters or slaves may be accomplished through operations and determinations made at the access point such that the tethering of the wireless devices may be centrally controlled and coordinated by the wireless communications network.

By partitioning wireless devices into clusters and allowing tethering within each cluster, the demands placed on an access point in communicating with a large number of wireless devices may be reduced. Also, the clustering and tethering within clusters may improve the wireless communication service provided to wireless devices on the edge of cells serviced by access points because those wireless devices may be slave wireless devices having better communication with their respective master wireless devices than their respective access point.

Additionally, partitioning wireless devices into clusters and tethering within each cluster may allow for lower power communications between the wireless devices themselves and/or the wireless devices and an access point. Lower power communications may allow for reuse of a limited frequency band allocated for wireless communications by the wireless devices by localizing the use of each frequency band within each cluster of wireless devices. Further, the tethering of wireless devices performed through the access point (and thus, in some instances, by the wireless communication network) may allow for a more efficient tethering of wireless devices than those currently employed.

In some embodiments, the tethering of wireless devices may be accomplished through an access point assigning a master wireless device as a hotspot for slave wireless devices based on communication channel quality information (referred to hereinafter as "channel quality information") associated with a communication channel (referred to hereinafter as a "channel" but is also referred to in the art as a "communication link," or "link") between the master wireless device and the access point. The master wireless device may also be assigned as the hotspot for the slave wireless devices based on channel quality information associated with channels between the master wireless device and the slave wireless devices, and/or channels between the slave wireless devices.

Additionally, in some embodiments and as described in detail below, the access point may allocate to the master wireless device one or more wireless communication resources such that the master wireless device may be configured as the hotspot for the slave wireless devices. In some embodiments, the access point may allocate the wireless communication resources based on a determination that a parameter requirement of one of the wireless communication resources associated with the master wireless device acting as the hotspot is met.

In these or other embodiments, the tethering of wireless devices may be accomplished through a signaling mechanism included with a radio resource control (RRC) establishment/reconfiguration procedure. For example, the access point may configure or reconfigure an RRC connection by communicating assignment information to each of the master wireless device and the slave wireless devices. The assignment information may indicate that the master wireless device is designated as the hotspot for the slave wireless devices. The master wireless device may perform operations to configure itself as the hotspot based on the assignment information. The slave wireless devices may also perform operations to act as slaves of the master wireless device based on the received assignment information. Therefore the wireless network may direct the tethering of wireless devices through instructions communicated via access points of the wireless network.

Embodiments of the present disclosure will be explained with reference to the accompanying drawings.

FIG. 1A illustrates an example wireless communication network 100 (referred to hereinafter as "network 100") configured to perform tethering of wireless devices, in accordance with some embodiments of the present disclosure. The network 100 may be configured to provide wireless communication services to one or more wireless devices 104 via one or more access points 102. The wireless communication services may be voice services, data services, messaging services, and/or any suitable combination thereof. The network 100 may include an Orthogonal Frequency Division Multiple Access (FDMA) network, a Code Division Multiple Access (CDMA) network, a Time Division Multiple Access (TDMA) network, and/or some other wireless communication network. In some embodiments, the network 100 may be configured as a third generation (3G) wireless communication network and/or a fourth generation (4G) wireless communication network. In these or other embodiments, the network 100 may be configured as a long term evolution (LTE) wireless communication network.

The access point 102 may be any suitable wireless communication network communication point and may include, by way of example but not limitation, a base station, a remote radio head (RRH), or any other suitable communication point. The wireless devices 104 may include any device that may use the network 100 for obtaining wireless communications services and may include, by way of example and not limitation, a cellular phone, a smartphone, a personal data assistant (PDA), a laptop computer, a personal computer, a tablet computer, or any other similar device.

In some embodiments, the access point 102 may be configured to partition the wireless devices 104 in clusters so that each cluster includes a master wireless device and one or more slave wireless devices. The master device may then offer wireless communication services to its respective slave devices through tethering. An example method of network controlled tethering is described with respect to FIG. 2.

FIG. 1B illustrates an example of clustering the wireless devices 104 that may be performed within the network 100, according to some embodiments of the present disclosure. In FIG. 1B, the wireless devices 104a included in clusters 106a-106d may be configured as master wireless devices (referred to hereinafter as "master devices"). The wireless devices 104b included in the clusters 106a-106d may be configured as slave wireless devices (referred to hereinafter as "slave devices"). The master devices 104a and the slave devices 104b may be assigned as master and slave devices, respectively, by the access point 102. Each of the master devices 104a may be configured to communicate with the access point 102 and the slave devices 104b included in their respective cluster 106. Additionally, each master device 104a may be assigned and configured as a hotspot to provide wireless communication services for the slave devices 104b included in their respective cluster 106. For example, the master device 104a of cluster 106a may communicate with the access point 102 and the slave devices 104b within the cluster 106a. Additionally, the master device 104a may act as a hotspot for the slave devices 104b within the cluster 106a.

The clusters 106 may reduce the demands placed on the access point 102 in communicating with the wireless devices 104 because the master devices 104a may perform some of the operations that may be traditionally performed by an access point. Additionally, in some embodiments, the clusters 106 may allow for lower power transmission of communication signals thereby allowing for the reuse of the same frequency band for communications. Accordingly, limited frequencies that may be available for communications may be better utilized. In these or other embodiments, the frequency band used within the clusters 106 may be a frequency band that may be used by the access point 102 or may be a frequency band available for general use (referred to hereinafter as "white space"). In some embodiments, the white space may be television white space ("TV white space") frequencies that opened up in the very-high frequency (VHF) and ultra-high frequency (UHF) bands as a result of conversion from analog to digital television signals and that are not being used by the primary users of the band (e.g. television broadcasters or wireless microphones).

Additionally, the designation of clusters 106 by the access point 102 may allow for a coordinated and relatively efficient tethering of the wireless devices 104. Accordingly, the tethering, as organized by the access point 102, may improve wireless communication services provided for the wireless devices 104, especially in venues with a large number of wireless devices and/or for wireless devices 104 that may be on the edge of a cell associated with the access point 102.

Modifications, additions, or omissions may be made to FIGS. 1A and 1B without departing from the scope of the present disclosure. For example, the network 100 may include any number of access points 102 and wireless devices 104. Additionally, the number and configuration of the clusters 106 may vary. Further, in some embodiments, all of the wireless devices 104 serviced by the network 100 may be organized into clusters 106 and in other embodiments a portion of the wireless devices 104 serviced by the network 100 may be organized into clusters.

FIG. 2 is a flow chart of an example method 200 of network controlled tethering of wireless devices, according to at least some embodiments of the present disclosure. The method 200 may be implemented, in some embodiments, by a wireless communication network, such as the network 100 described with respect to FIGS. 1A and 1B. For instance, the access point 102, master wireless devices 104a and/or slave wireless devices 104b of the network 100 of FIG. 1 may be configured to execute computer instructions to perform one or more operations for tethering the wireless devices 104, as represented by one or more blocks of the method 200. Although illustrated as discrete blocks, various blocks may be divided into additional blocks, combined into fewer blocks, or eliminated, depending on the desired implementation.

The method 200 may begin at block 202, where different wireless devices located within a service area of a wireless communication network access point ("access point") may be organized into clusters. One of the wireless devices of each cluster may be designated as a master device that acts as a hotspot for each of the other wireless devices of the same cluster. The other wireless devices not designated as a master device may be designated as slave devices. In some embodiments, the clustering designation may be performed by the access point and may be based on channel quality information of communication channels between the wireless devices and the access point. In these or other embodiments, the clustering designation may also be based on channel quality information of communication channels between each of the wireless devices.

In some embodiments, the channel quality information may be determined based on one or more channel quality indication (CQI) reports received by the access point from each of the wireless devices. Each CQI report may indicate average channel gains for a channel between either one wireless device and the access point, or between different wireless devices. The CQI reports may be communicated to the access point on a periodic basis from the wireless devices and/or may be communicated to the access point based on a request for the CQI report by the access point. In some embodiments, the CQI reports may be generated based on beacon signals sent between the wireless devices and the access point and between different wireless devices to produce channel estimation.

In these or other embodiments, using the channel gain, the clustering may be based on minimizing the total transmission power of each transmitting entity in the network. In uplink transmissions, the transmission power may include the total transmission power of all wireless devices (e.g. all slave and master devices) and in downlink transmissions, the transmission power may include the transmission power of the access point and the transmission power of all the master devices. Additionally, in these or other embodiments, using the channel gain, the clustering may be based on maximizing the spectral efficiency of the wireless communication network. In this setting, the master and slaves devices are selected in such a manner that the total spectral efficiency of the network may be maximized.

By way of example, clustering based on minimizing the transmission power may be based on clustering the wireless devices such that transmission power between master devices and their respective slave devices and transmission power between the master devices and the access point may be substantially minimized. In some embodiments, a matrix with elements representing the different channels between every two nodes (e.g., wireless devices and/or the access point) may be generated. The elements may be given different weights based on the relative importance of the two nodes being connected to each other in the resulting clustering configuration. The weights are generally feedback values to the clustering block (block 202) of the method 200 received from other blocks of the method 200. The clustering may be a function of both the channel gain and the weight. For example, if the channel gains between node "i" and the nodes "$j_1$" and "$j_2$" are equal, but the relative weight between node "i" and "$j_1$" is greater than the weight between node "i" and node "$j_2$", it is more likely that node "i" and node "$j_1$" will be connected as slave and hotspot in the clustering result.

In some embodiments, minimizing the transmission power may be based on determining an optimal sum of the elements of the matrix. For example, minimizing the transmission power may be done based on the following expression:

$$\min y \sum_{j=1}^{U} \left\{ \frac{y_{jj}}{w_{jj}g_{jj}} + \frac{\sum_{i \neq j} y_{ij}}{w_{jj}g_{jj}} + \sum_{i \neq j} \frac{y_{ij}}{w_{ij}g_{ij}} \right\}$$

The above expression "U" may represent the number of wireless devices to be included in the clustering; "$y_{jj}$" may represent the channel between a wireless device and the access point. The term "$y_{jj}$" may be equal to "1" if the wireless device is to act as a master device and may be a "0" otherwise. The term "$y_{ij}$" may represent the channel between two wireless devices represented by "i" and "j." The term "$y_{ij}$" may be given a "1" if the wireless device represented by "j" is to act as the master of the wireless device represented by "i" and may be a "0" otherwise. The term "$w_{jj}$" may represent a weight given to the associated channel represented by "$y_{jj}$." The term "$w_{jj}$" may have a value between "0" and "1" and may be initialized to "1." The term "$w_{ij}$" may represent a weight given to the associated channel represented by "$y_{ij}$." The term "$w_{ij}$" may have a value between "0" and "1" and may be initialized to "1." The term "$g_{ij}$" may represent the channel gain of the associated channel represented by "$y_{jj}$" and the term "$g_{ij}$" may represent the channel gain of the associated channel represented by "$y_{ij}$."

To perform the optimization, the above expression may be subject to the following constraints:

$$\sum_{j=1}^{U} y_{ij} = 1, \forall i \qquad (1)$$

$$y_{ij} \leq y_{jj}, \forall i,j \qquad (2)$$

$$y_{ij} \in \{0,1\}, \forall i,j \qquad (3)$$

In the above constraints, the constraint (1) indicates that each wireless device "i" may have only one transmitter (or receiver) in a downlink mode (or uplink mode). The constraint (2) may force a slave device represented by "i" to be connected to a master device represented by "j" only if wireless device "j" is a master device. Additionally, the constraint (3) may ensure that each "$y_{ij}$" is either a "1" or a "0."

Returning to the method 200, at block 204, one or more wireless communication resources may be allocated for communications between the master devices and their respective slave devices. In some embodiments, the wireless communication resources may be a subcarrier band of an OFDMA network or a resource block of an LTE network. Accordingly, in some embodiments, the access point or a master device selected in block 202 may allocate LTE resource blocks within an LTE frequency band with an OFDMA approach using parameter requirements (e.g., power and data rate requirements) associated with the master device providing wireless communication services for the slave devices. In some embodiments, the wireless communication frequency band may be a frequency band that the access point is using to communicate with the wireless devices. In other embodiments, the wireless communication frequency band may be a different frequency band, for example, a white-space band such as the TV white-space band. The bandwidths of the resource blocks and the frequency band may correspond to the communications protocol that is being used by the wireless communication network.

For example, an LTE network supports scalable communication frequency bandwidths of 1.4, 3, 5, 10, 15, and 20 Megahertz (MHz). LTE divides each frequency band into resource blocks having a 180 Kilohertz (KHz) bandwidth. In addition, according to LTE specifications, resource allocation is based on resource block groups (RBG). The number of resource blocks in each RBG depends on the bandwidth of the frequency band. For example, for a 5 MHz frequency band there are 13 resource block groups with each group having a bandwidth of 360 KHz. Additionally, the communication protocol and resource allocation used for wireless access over white space bands may be based on a cellular (e.g. LTE or LTE-A) physical layer and multiple access control layer technology. Further, in some embodiments, the allocation of resource block groups may be such that each resource block group in a cluster may each be used by a different slave device associated with another cluster.

As mentioned above, the allocation of resource blocks may be based on power and data rate requirements associated with the master device acting as a hotspot for each of the slave devices within the same cluster. The data rate requirement for each slave device may include the minimum amount of data that the slave device may be configured to send and receive over a certain period of time. The power requirement for each slave device may include an amount of power that may be needed to effectuate communications between the master device and the slave device and may be based on the channel gain of the channel between the master device and the slave device. In some embodiments, the master device may obtain the channel gain based on a CQI report generated for the channel between the master device and the slave device.

Another power requirement may be a power constraint based on the amount of power that may be transmitted by each cluster in each resource block group such that interference experienced by communications being transmitted in the same resource block group by other clusters may appear as background noise. Accordingly, if the power constraint is sufficiently met, the same resource block groups may be used by different clusters with minimal or no interference with each other. With reduced interference between clusters, the spectral efficiency of the wireless communication network may be increased. In some embodiments, the maximum transmission power over each resource block group in a cluster so that communications over the same resource block group in other clusters do not substantially interfere with each other may be defined by the following expression:

$$T_j^n = \frac{\alpha N_0}{\max_{k \in K}\{g_{lk}^n\}}$$

In the above expression, "$T_j^n$" may represent the maximum power that a cluster represented by "j" may transmit over a resource block represented by "n." With an abuse of notation, the clusters are denoted by the device number of their corresponding master device "j." The term "$\alpha$" may represent a proportionality factor of the noise power and may have a value between "0" and "1." The term "$N_0$" may represent the noise power at the receiver. The gain "$g_{lk}$" may represent the channel gain between the master device of the cluster "x" and the slave devices of other clusters in downlink communications. For uplink communications, the gain "$g_{lk}$" may represent the channel gain between the slaves of the cluster "j" and the master devices of other clusters.

In some embodiments, a master device of a cluster may solve an optimization problem to determine a minimum amount of power needed to satisfy the power and data rate requirements. The optimization may be based on which resource block groups may be used to reduce the power over the channels between the master device and slave devices within the cluster. In some embodiments, the optimization problem may be solved based on the following expressions and constraints:

$$\min_{X,P} \Sigma_{i \in S_j} \Sigma_{n=1}^N p_{ij}^n$$

$$\text{subject to } \sum_{n=1}^{N} x_{ij}^n b \, \log\left(1 + \frac{p_{ij}^n g_{ij}^n}{x_{ij}^n N_0}\right) \geq R_i, \, \forall \, i \in S_j \quad (5)$$

$$p_{ij}^n \leq T_x^n, \forall i \in S_j, \forall n \quad (6)$$

$$\Sigma_{i \in S_j} x_{ij}^n \leq 1, \forall n \quad (7)$$

$$p_{ij}^n \geq 0, \forall i \in S_j, \forall n. \quad (8)$$

$$x_{ij}^n \in \{0,1\}, \forall i \in S_j, \forall n. \quad (9)$$

In the above expressions and constraints, the term "$S_j$" represents the slave devices of cluster "j." The terms "n" and "N" respectively represent a resource block "n" out of a number of resource blocks "N" that may be used within the cluster. The term "$p_{ij}^n$" represents the power allocated to the "n" resource block over a channel between the master device represented by "j" and the respective slave device represented by "i." Further, the term "$x_{ij}^n$" indicates whether the resource block "n" is being used over the channel between the master device represented by "j" and the respective slave device represented by "i." Additionally, the term "$g_{ij}^n$" represents the channel gain over the resource block "n" of the channel between the master device represented by "j" and the respective slave device represented by "i." Additionally, the term "$R_i$" may represent the rate requirement of the slave device represented by "i." Further, the term "$N_0$" may represent the noise power associated with the resource block and the term "b" represents the bandwidth of each resource block group Also, "$T_j^n$" may represent the maximum power that a cluster represented by "j" may transmit over the resource block represented by "n" described above. The constraints (5) and (6) may ensure that the optimization satisfies the data rate and power constraints, respectively. Additionally, the constraint (7) may ensure that each resource block within each cluster is used between only slave and the corresponding master device. The constraint (8) may ensure that the power is positive and the constraint (9) may ensure that each "$x_{ij}^n$" is either a "1" or a "0."

In some embodiments, another power requirement may be based on a regulatory constraint on an amount of power a signal communicated over a transmission band may use within the cluster. For example, the United States FCC regulations dictate that transmissions over TV white-space may not exceed a certain power limit for each designated frequency band of the TV white-space (e.g. 40 milliwatts (mW) if the adjacent TV white space channel is occupied by a primary user). Accordingly, in embodiments implemented in the United States where the cluster may use TV white-space as a transmission band, the above optimization problem may include an additional power constraint associated with complying with the associated regulatory power constraint over the designated frequency band.

At block 206, it may be determined whether the power and data requirements associated with the resource allocations to the slave devices are met. For example, the master device may determine whether the optimization problem described above is feasible based on the different power and data rate requirements.

If the power and/or data rate requirements are not met, the method 200 may return to block 202 in which the wireless devices may be grouped into different clusters based on the power and/or data rate requirements not being met. Blocks 202 through 206 may therefore be repeated until determination of a clustering configuration that satisfies the power and data rate requirements. In some embodiments, the access point may remove some of the wireless devices from the clustering or withdraw from the tethering mode of operation after a certain number of unsuccessful reconfigurations has been reached.

In some embodiments, the weight associated with one or more channels between wireless devices used in the optimization problem described above with respect to block 202 may be modified based on the power and/or data requirements not being met. For example, the power and/or data rate requirements may not be met within a cluster. In such a scenario, the weight associated with the channel between the master device of the corresponding cluster and the slave device within that cluster that requires the largest amount of transmission power may be reduced. Such modification of the weights may force the slave device that requires the largest amount of resources out of the troubled cluster (whose power and/or data rate requirements are not met) in the next iteration of clustering (block 202). Such weight updates may result in the clustering step (block 202) producing a configuration where the power and data rate requirements are met within all clusters.

If the power and data rate requirements are determined to have been met at block 206, the method 200 may proceed to block 208. At block 208, resources (e.g., resource blocks in an LTE network) for effectuating communications between the access point and the master devices of the respective clusters may be allocated among the different master devices. The resource allocation may include power and data rate requirements similar to those described above with respect to block 204. Therefore, the power requirements may be such that enough transmission power is used to effectuate communications between the access point and the master devices, but also such that the communications do not interfere with communications between other access points and wireless devices and/or communications between the master and slave devices. Additionally, the data rate requirements between the access point and each master device may be based on the sum of the data rate requirements of the master device and the slave devices associated with the respective master device.

In some embodiments, the access point may perform the resource allocation for the master devices using an optimization problem similar to that used to perform the resource allocation for the slave devices in block 204. The optimization problem may be solved based on the following expressions and constraints:

$$\min_{X,P} \Sigma_{j \in H} \Sigma_{m=1}^{M} p_{jj}^{m}$$

$$\text{subject to } \sum_{m=1}^{M} x_{jj}^{m} b \, \log\left(1 + \frac{p_{jj}^{m} g_{jj}^{m}}{x_{jj}^{m} N_0}\right) \geq R_j + \sum_{i \in S_j} R_i, \forall j \in H \quad (9)$$

$$p_{jj}^{m} \leq Z^{m}, \forall j \in H, \forall m \quad (10)$$

$$\Sigma_{j \in H} x_{jj}^{m} \leq 1, \forall m \quad (11)$$

$$p_{jj}^{m} \geq 0, \forall j \in H, \forall m \quad (12)$$

$$x_{jj}^{m} \in \{0,1\}, \forall j \in H, \forall m \quad (13)$$

In the above expressions and constraints, the term "j∈H" represents the master devices associated with the access point. The terms "m" and "M" respectively represent a resource block "m" out of a number of resource blocks "M" that may be used for communication between the access point and the master devices. The term "$p_{jj}^{m}$" represents the power allocated to the "m" resource block over a channel between a respective master device and the access point. Further, the term "$x_{jj}^{m}$" indicates whether the resource block "m" is being used over the channel between a respective master device and the access point. Additionally, the term "$g_{jj}^{m}$" represents the channel gain over the resource block "m" of the channel between the respective master device and the access point. Additionally, the terms "$R_i$" and "$R_j$" may represent respectively, the rate requirements of the slave devices associated with a respective master device and the rate requirement of the respective master device. Further, the term "$N_0$" may represent the noise power of the respective resource block "m." Also, "$Z^m$" may represent the maximum power that may be transmitted over a resource block represented by "m." The constraints (9) and (10) may ensure that the optimization satisfies the data rate and power constraints, respectively. Additionally, the constraint (11) may ensure that each channel between the access point and the master devices is allocated a different resource block. Constraint (12) may ensure that the power is positive and the constraint (13) may ensure that each "$x_{jj}^{m}$" is either a "1" or a "0."

At block 210, it may be determined whether the power and data requirements associated with the resource allocations to the master devices are met. For example, the access point may determine whether the optimization problem described above for the resource allocation to master devices is feasible based on the different power and data requirements.

If the power and/or data rate requirements are not met at block 210, the method 200 may return to block 202 in which the wireless devices may be grouped into different clusters based on the power and/or data requirements not being met. Blocks 202 through 208 may therefore be repeated until determination of a clustering configuration that satisfies the power and data rate requirements associated with communications between the access point and the master devices.

In some embodiments, the weight associated with one or more channels between a master device and the access point used in the optimization problem described above with respect to block 202 may be modified based on the power and/or data requirements not being met. For example, if the master device power and/or rate requirements are not met, the weight corresponding to the channel between the access point and the master device that requires the largest transmission power may be reduced. Such modification of the weights may result in forcing the master device that requires the largest amount of resources to be a slave in the next iteration of clustering (block 202). Such weight updates may result in the clustering step (block 202) producing a configuration where the power and data rate requirements are met within all clusters and among all master devices. Additionally, in some embodiments, in order to keep a long-term fairness for the wireless devices designated as the master device, the access point may re-cluster the wireless devices based on the amount of power headroom left through reducing the weight associated with the master devices having lower battery power levels.

If the power and data rate requirements are met at block 210, the resulting configuration of master and slave devices of each cluster may be maintained such that the clustering and tethering of wireless devices may be complete and the method 200 may end. Therefore, the method 200 may include an algorithm for clustering wireless devices that may then be tethered according to the clustering. As mentioned above, such network controlled clustering and tethering may improve the efficiency of a wireless communication network and may allow for providing better wireless communication services in areas and situations where a relatively large number of wireless devices are within a relatively small area.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Additionally, although much of the above description is given with respect to LTE networks and standards, the method 200 may be modified for any applicable network using any suitable standard.

Also, although certain elements of the wireless network are described as performing certain functions, in other embodiments other elements may perform those functions. For example, in the above description, the master device is described as performing resource allocation for its respective slave devices and determining whether the power and data rate requirements associated therewith are met. However, in other embodiments, the access point may perform the resource allocation for the slave devices and may determine whether the power and data rate requirements associated therewith are met. Additionally, the access point may group the wireless devices into clusters based on not only the channel gains as discussed above but also the wireless device requirements and constraints of the resource allocation. In these embodiments, the access point may communicate the resource allocation to the master device.

As previously mentioned, in some embodiments the tethering and clustering described above with respect to FIGS. 1A through 2 may be accomplished through a signaling mechanism in which RRC establishment and reconfiguration procedures may be modified. FIGS. 3-6 illustrate example aspects of the signaling mechanisms that may be used to cluster wireless devices and to enable tethering of the wireless devices among the clusters.

Figure 3:
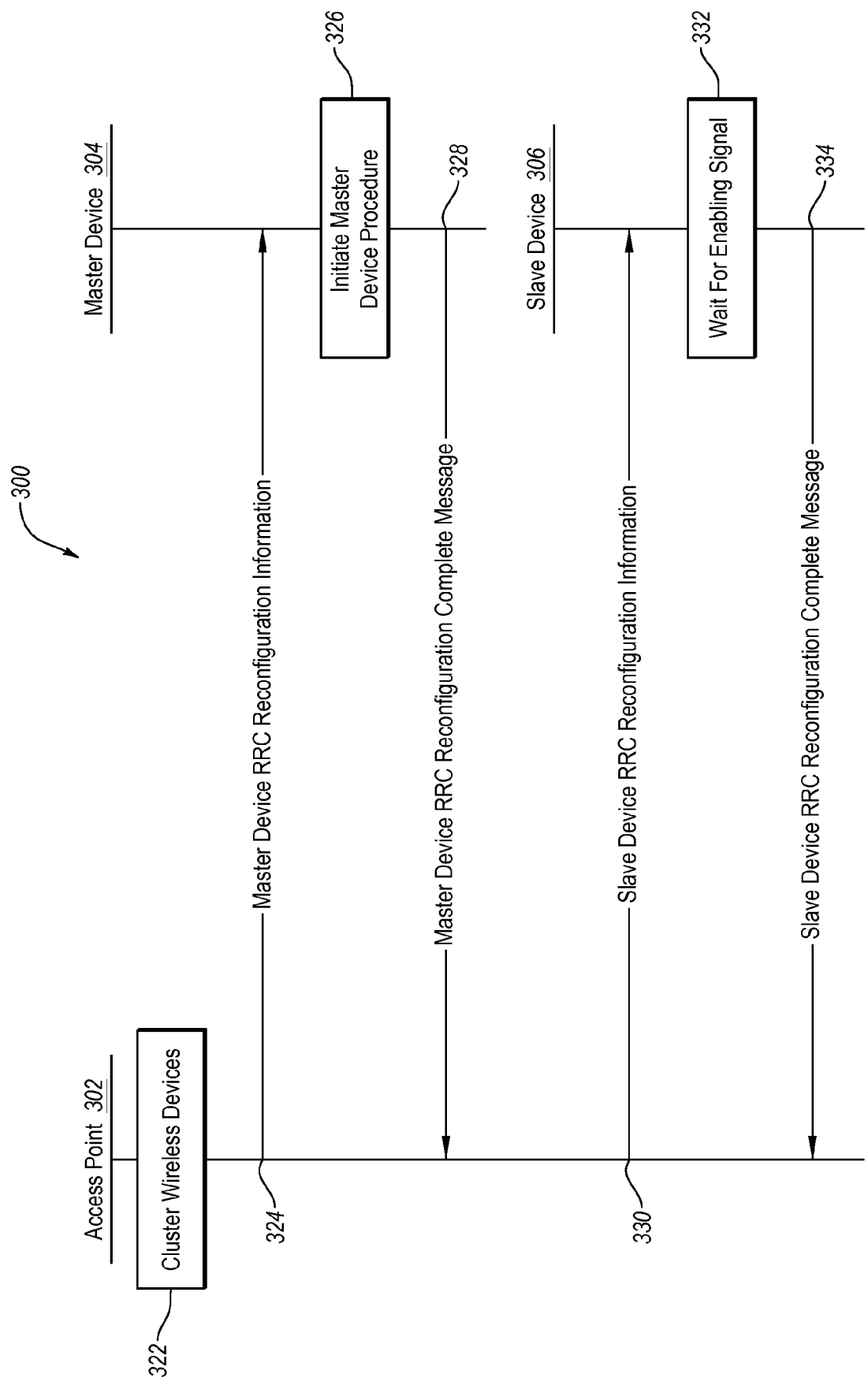
FIG. 3 illustrates an example signaling mechanism for reconfiguring an existing connection between an access point and one or more wireless devices.

FIG. 3 illustrates an example signaling mechanism 300 for reconfiguring an existing RRC connection between an access point 302 and one or more wireless devices, according to some embodiments described herein. The access point 302 may be substantially similar to the access point 102 of FIG. 1 and the wireless devices may be substantially similar to the wireless devices 104 of FIGS. 1A and 1B.

In the signaling mechanism 300, the access point 302 may cluster wireless devices at a step 322. In some embodiments, the clustering may be performed as described above with respect to block 202 of the method 200. Accordingly, the clustering may be used to determine which wireless devices may be designated as master devices and which may be designated as slave devices.

At a step 324, the access point 302 may communicate master device RRC reconfiguration information to a master device 304 of a cluster designated as such during the clustering of step 322. The master device RRC reconfiguration information may include master assignment information indicating that the master device 304 is to act as a hotspot to provide wireless communication services for one or more slave devices, such as a slave device 306. The master assignment information may additionally include a list of the slave devices that are designated as slave devices associated with the master device 304. In some embodiments, the master assignment information may also include a list of other wireless devices that may be designated as master devices.

At a step 326, the master device 304 may initiate a master device procedure to attempt to establish a connection with (also referred to herein as "associate with") and allocate wireless communication resources to its designated slave devices, such as the slave device 306. A more detailed description of the master device procedure is given with respect to FIG. 4. In some embodiments where the access point carries out both clustering and the resource allocation for the clusters, the master device procedure may be reduced to channel association with its respective slaves.

At a step 328, the master device 304 may communicate a master device RRC reconfiguration complete message to the access point 302. The master device RRC reconfiguration complete message may indicate whether the master device 304 accepts or declines to act as the hotspot for its designated slave devices. In some embodiments, the master device 304 may accept or decline to act as a hotspot based on whether parameter requirements associated with the master device 304 acting as a hotspot are met, such as described above with respect to blocks 204 and 206 of the method 200 of FIG. 2. For example, the master device 304 may decline to act as the hotspot if the master device is not able to meet parameter requirements, such as power and/or data rate requirements, during the resource allocation to the different slave devices.

Additionally, in some embodiments, the master device 304 may accept or decline to act as a hotspot based on whether link associations with its designated slaves are successful. For example, the master device 304 may decline to act as the hotspot if one or more of the slave devices fail to respond to the master device 304's attempts to establish a connection with the slave devices. However, if the master device 304 is able to establish a connection with its designated slave devices and the parameter requirements are met, the master device RRC reconfiguration complete message may indicate that the master device 304 accepts to act as a hotspot for its designated slave devices.

If the RRC reconfiguration complete message indicates that the master device 304 declines to act as a hotspot, the access point 302 may re-cluster the wireless devices. In some embodiments, the RRC reconfiguration complete message may include the reason for declining to serve as a master device. In some embodiments, the access point 302 may perform the re-clustering as described above with respect to method 200 of FIG. 2. If the RRC reconfiguration complete message received from all the designated master devices indicates that the master devices accept to act as hotspots, the access point 302 may allocate resources for the master devices, such as the master device 304, such as described above with respect to blocks 208 and 210 of method 200 of FIG. 2.

At step 330, the access point 302 may also communicate slave device RRC reconfiguration information to the slave device 306 associated with the master device 304, which may be designated as such during the clustering performed at the step 322. The slave device RRC reconfiguration information may include slave assignment information. The slave assignment information may include an indication that the slave device 306 is to be a slave of the master device 304. In some embodiments, the slave assignment information may also include a list of other wireless devices that may act as master devices.

At a step 332, the slave device 306 may wait for an enabling signal from the master device 304. As discussed in further detail below with respect to FIG. 4, the enabling signal may be used to begin and to establish the master/slave connection between the master device 304 and the slave device 306. In some embodiments, the slave device 306 may respond to the enabling signal from the master device 304 and may ignore enabling signals from other master devices based on the indication in the slave assignment information that the master device 304 is designated as the hotspot for the slave device 306.

At a step 334, the slave device 306 may send a slave device RRC reconfiguration complete message to the access point 302. The RRC reconfiguration complete message may indicate whether the slave device 306 ever received the enabling signal from the master device 304 and successfully associated with the master device 304 to receive wireless communication services from the wireless device 304. If the RRC reconfiguration complete message indicates that the slave device 306 did not associate with the wireless device 304, the access point 302 may re-cluster the wireless devices. In some embodiments, during the re-clustering, the slave device 306 may be reassigned to another master device, re-designated as a master device, or not assigned to another cluster.

Once a clustering configuration has been accepted (e.g., once all the master devices confirm their RRC reconfiguration procedure), the access point may perform signaling for uplink/downlink resource allocation for the master devices. In embodiments with cellular systems, downlink control information (DCI) format may be modified and used to send the resources scheduled. In some of these embodiments, the master devices may perform the resource allocation and in other embodiments the access point may perform the resource allocation.

In embodiments where the master devices perform the resource allocation, the access point may send a determined DCI format to a master device based on the current specification being used (e.g., LTE). For example, in some embodiments, one bit from already used zero-padding bits may be flagged to notify that the scheduling is for a hotspot mode operation of the master device. Once the master device (as designated by the access point) receives its scheduling from the access point, the master device may send the determined DCI format used for signaling scheduled resources to its respective slave devices. In some embodiments, if the frequency band being used for the master-slave communication is over white space, a new DCI format may be defined.

For example, for DCI TV white space, since the resources are scheduled over the TV white space band and may be shared among multiple wireless devices, the DCI may include a master device identifier (ID) and a slave ID as well as other already defined information fields (e.g. resource blocks and modulation/coding schemes). Additionally, because the TV white space bands may be employing cellular-like access, a new operating band corresponding to the TV white space bands may be defined according to the specification being used for the wireless communication (e.g., the LTE specification). Accordingly, in some embodiments, resolution bits to identify the frequency sub-band (sometimes referred to in the art as "channels" or "channel number") associated with the TV white space band operation. For example, the resolution bits may include a TV white space band portable device mode plus 5 bits of resolution to indicate which carrier frequency may be used by the master and slave devices. This information may be broadcasted in a system information block (e.g., SIB1).

As mentioned above, in some embodiments, the access point may perform the resource allocation for the channels between master devices and their respective slave devices. Such a configuration may simplify the complexity of the wireless devices and may avoid overhead reconfiguration upon a failed clustering.

In such embodiments, the access point may communicate the DCI to the master device to indicate which wireless communication resources the master device may use for communication with the access point according to the communication specification being used. Additionally, the access point may communicate master/slave DCI (e.g., TV white space DCI) to indicate which wireless communication resources may be used for communication between the master device and its respective slave devices. The master/slave DCI may accordingly include master device and slave device IDs such that both the master and slave devices may learn which resources to use for data transmission and reception.

Accordingly, the signaling mechanism 300 may be used to reconfigure RRC connections to establish clustering and tethering of wireless devices. Additionally, in some embodiments, the signaling mechanism 300 may be utilized with the method 200 to provide the appropriate information for clustering and tethering of wireless devices through the method 200. Further, the signaling mechanism 300 may be used to facilitate scheduling of wireless communication resources between master devices and their respective slave devices and master devices and their respective access points.

One skilled in the art will appreciate that, for this and other processes and methods disclosed herein, the functions performed in the processes and methods of the signaling mechanism 300 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the order of operations of the steps described may or may not be performed in the order described above. Additionally, one or more steps may be performed at the same time, or may include one or more other operations. For example, as described below with respect to FIG. 4, the master device procedure associated with the step 326 may include additional steps than those described above.

Additionally, the signaling mechanism 300 is described with respect to reconfiguring an already existing RRC connection based on the wireless devices being in active communication with the access point 302. However, at times the wireless devices may be in an idle state such that the signaling mechanism 300 may be modified. The modifications that may be applied to the signaling mechanism 300 when the wireless devices are in an idle state are described below with respect to FIGS. 5-6.

Figure 4:
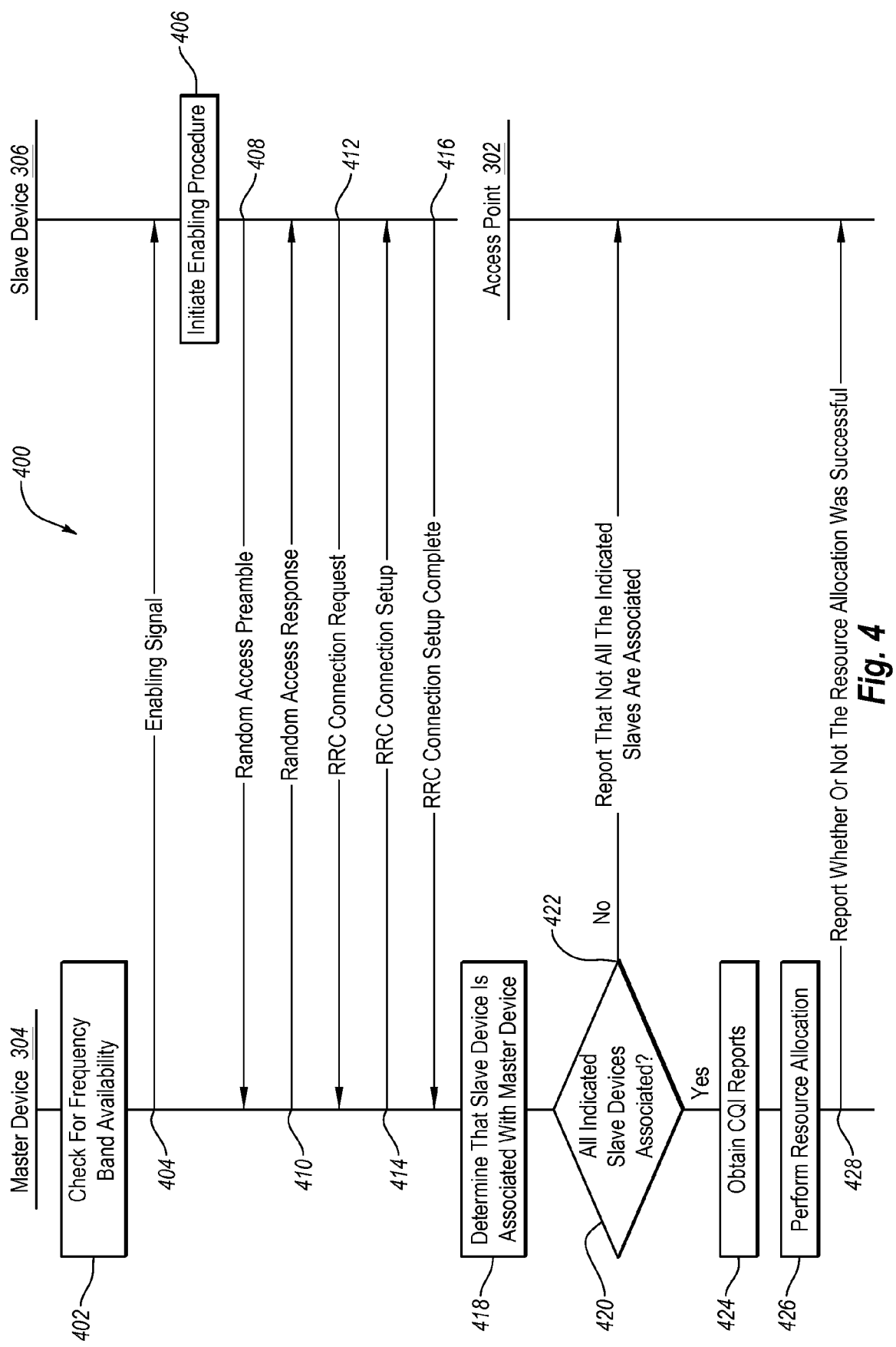
FIG. 4 illustrates an example signaling mechanism for performing a master device procedure that establishes a connection between a master device and a slave device.

FIG. 4 illustrates an example signaling mechanism 400 for performing a master device procedure that establishes a connection between a master device and a slave device (also referred to hereinafter as a "master/slave connection"), according to some embodiments described herein. As mentioned above the signaling mechanism 400 may be performed with respect to the signaling mechanism 300, such as at the step 326, described above. As such, in the present example, the signaling mechanism 400 is described with respect to the access point 302, the master device 304 and the slave device 306 of the signaling mechanism 300 of FIG. 3. However, any suitable access point, master device and/or slave device may also perform one or more operations of the signaling mechanism 400.

At a step 402 of the signaling mechanism 400, the master device 304 may check for an availability of a frequency band over which the master device 304 may effectuate communications with its designated slave devices. The master device 304 may perform the step 402 in response to receiving master device RRC reconfiguration information such as described with respect to step 324 of the signaling mechanism 300. In some embodiments, the master device 304 may check for the availability of white space frequency bands such as TV white-space bands through checking with a certified database, or via communicating with the access point, utilizing a spectrum sensing technology, or any other suitable manner.

At a step 404, the master device 304 may communicate an enabling signal to the slave device 306. The enabling signal may indicate to the slave device 306 that the master device 304 is attempting to establish a master/slave connection between the master device 304 and the slave device 306 such that the slave device 306 may be associated with the master device 304. Additionally, the enabling signal may be communicated over the available frequency band determined in the step 402.

At a step 406, the slave device 306 may initiate an enabling procedure. In some embodiments, the enabling procedure may include a random access procedure that may include a step 408 where the slave device 306 may communicate a random access preamble to the master device. The master device 304 may respond with a random access response at a step 410. In some embodiments, the slave device 306 may accordingly respond with an RRC connection request at a step 412. In some embodiments, the RRC connection request may include an identification number of the slave device 306 that may be required by a communications regulation. For example, if the frequency band used is within the TV white space band in the United States, the RRC connection request may include an FCC identification number associated with the slave device 306.

The master device 304 may respond to the RRC connection request with an RRC connection setup message at a step 414. The slave device 306 may accordingly setup the RRC connection based on the received RRC connection setup message and may communicate an RRC connection setup complete message to the master device 304 at a step 416. The RRC connection setup complete message may indicate that the RRC connection between the master device 304 and the slave device 306 is complete such that the slave device 306 may be associated with the master device 306.

At a step 418, the master device 304 may determine that the slave device 306 is associated with the master device 304 based on the completion of the RRC connection at the step 416. At a step 420, the master device 304 may determine whether all the slave devices designated as slave devices to the master device 304 (e.g., as indicated by master assignment information included in the master device RRC reconfiguration information) have associated with the master device 304. If all the designated slave devices have not associated with the master device 304, the master device 304 may notify the access point 302 at a step 422. Additionally, in some embodiments, the notification may indicate that the master device 304 declines to act as a hotspot based on all the slave devices not associating with the master device 304. Further, in some embodiments, the master device 304 may notify the access point 302 via a master device RRC reconfiguration complete message, such as that described above with respect to the step 328 of the signaling mechanism 300 of FIG. 3.

In contrast, if all the slave devices designated for the master device 304 have associated with the master device 304, the master device 304 may obtain CQI reports at a step 424. The CQI reports may indicate channel gain information for the channels between the master device 304 and its associated slave devices. In these or other embodiments, the CQI reports may also indicate channel gain information for the channels between the master device 304 and other master devices and/or channel gain information for the channels between other master devices and one or more slave devices associated with the master device 304.

At a step 426, based on the channel gain information, the master device 304 may perform resource block allocation for its associated slave devices. The resource blocks may include sub-frequency bands associated with the frequency band selected in the step 402 for effectuating communications between the master device 304 and its associated slave devices. Additionally, in some embodiments, the master device 304 may perform the resource block allocation according to the blocks 204 and 206 described above with respect to method 200 of FIG. 2.

At a step 428, the master device 304 may report to the access point 302 whether or not the resource allocation was successful. In some embodiments, the master device 304 may include in the report whether it accepts or declines to act as a master device based on whether or not the resource allocation was successful. Additionally, in some embodiments, the master device 304 may include the report in a master device RRC reconfiguration message, such as that described above with respect to the step 328 of the signaling mechanism 300 of FIG. 3.

Accordingly, the signaling mechanism 400 may be utilized to establish the master/slave connections between the master device 304 and its associated slave devices. Additionally, the signaling mechanism 400 may be utilized to determine whether or not the master device 304 may act as a hotspot for its designated slave devices.

One skilled in the art will appreciate that, for this and other processes and methods disclosed herein, the functions performed in the processes and methods of the signaling mechanism 400 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, the signaling mechanism 400 may be used to establish any number of master/slave connections between the master device 304 and its designated slave devices. Additionally, the step 428 may be eliminated for the case where the resource allocation for each cluster is performed at the access point.

Figure 5:
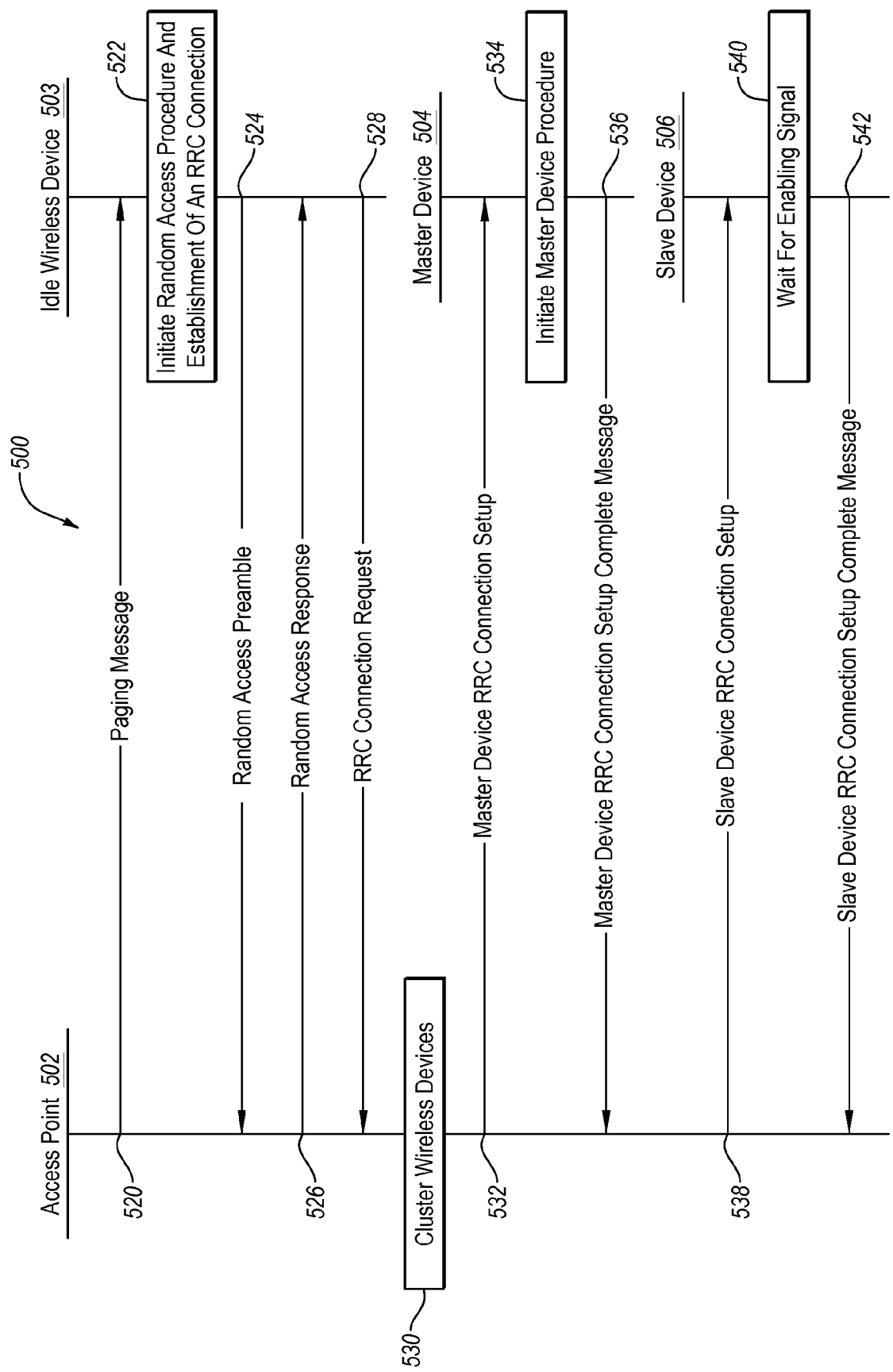
FIG. 5 illustrates an example signaling mechanism for clustering and tethering wireless devices in an idle state.

As mentioned above, at times wireless devices that are to be clustered and tethered may not be in an active connection state with an access point, for example, the wireless devices may be in an idle state. In such instances, the signaling mechanism used to tether and cluster the wireless devices may be modified. FIG. 5 illustrates an example signaling mechanism 500 associated with clustering and tethering wireless devices in an idle state, such as an idle wireless device 503, in accordance with at least some embodiments described herein.

In the illustrated embodiment, the signaling mechanism 500 may begin with an access point 502 (substantially similar to the access point 102 described above with respect to FIGS. 1A and 1B) communicating at a step 520 a paging message to idle wireless devices which may be any suitable wireless devices (such as the wireless devices 104 of FIGS. 1A and 1B.). In the illustrated embodiment, the paging message is depicted as being communicated to the idle wireless device 503 for ease in illustration and explanation. However, it is understood that the paging message may be received by other idle wireless devices also. The paging message may wake up the idle wireless device 503 such that the idle wireless device 503 may initiate a random access procedure and the establishment of an RRC connection at a step 522 in order to receive downlink data.

The random access procedure may include the idle wireless device 503 communicating a random access preamble to the access point 502 at a step 524. At a step 526, the access point 502 may communicate a random access response to the idle wireless device 503 based on the received random access preamble. The random access response may be different from a traditional random access response in that it may include a CQI report request. At a step 528, the idle wireless device 503 may communicate an RRC connection request in response to the received random access response. The RRC connection request may also include a CQI report in response to the CQI report request included in the random access response. The CQI report may include channel gain information associated with channel between the access point 502 and the idle wireless device 503, as well as channel gain information associated with channels between the idle wireless device and other wireless devices. The CQI report may include a wideband channel report, narrowband channel report, a channel report for each resource block group, or any combination thereof.

At a step 530, the access point 502 may cluster wireless devices within its transmission range based on CQI reports received from the paged wireless devices, such as the idle wireless device 503. In some embodiments, the access point 502 may cluster the wireless devices based on the method 200 described above with respect to FIG. 2. Following the clustering at the step 530, the access point 502 may communicate RRC connection setup messages to master devices and slave devices determined as such in the clustering.

For example, the access point 502 may communicate a master device RRC connection setup message to a master device 504 at a step 532. The access point may also communicate a slave device RRC connection setup message to a slave device 506 at a step 538. The master device RRC connection setup message may include master assignment information indicating that the master device 504 is to act as a hotspot to provide wireless communication services for one or more slave devices, such as the slave device 506. The master assignment information may additionally include a list of the slave devices that are designated as slave devices associated with the master device 504. In some embodiments, the master assignment information may also include a list of other wireless devices that may be designated as master devices. The slave device RRC connection setup message may similarly include slave assignment information. The slave assignment information may include an indication that the slave device 506 is to be a slave of the master device 504. In some embodiments, the slave assignment information may also include a list of other wireless devices that may act as master devices.

At a step 534, in response to the received master device RRC connection setup message, the master device 504 may initiate a master device procedure to attempt to establish a connection with and allocate wireless communication resources (e.g., resource blocks) to its designated slave devices, such as the slave device 506. In some embodiments, the master device procedure may be performed according to the signaling mechanism 400 described above with respect to FIG. 4.

At a step 536, the master device 504 may communicate a master device RRC connection setup complete message to the access point 502. The master device RRC setup complete connection message may indicate whether the master device 504 accepts or declines to act as the hotspot for its designated slave devices. In some embodiments, the master device 504 may accept or decline to act as a hotspot based on whether association with its designated slaves are successful and/or whether parameter requirements associated with the master device 504 acting as a hotspot are met, such as described above with respect to blocks 204 and 206 of the method 200 of FIG. 2.

Similar to as described above with respect to the signaling mechanism 300, if the RRC setup complete connection message indicates that the master device 504 declines to act as a hotspot, the access point 502 may re-cluster the wireless devices. In some embodiments, the access point 502 may perform the re-clustering as described above with respect to method 200 of FIG. 2. If the RRC setup complete connection message from all master devices (including the master device 504) indicates that the master devices accept to act as hotspots, the access point 502 may allocate wireless communication resources for the master devices (including the master device 504) such as described above with respect to blocks 208 and 210 of method 200 of FIG. 2.

At a step 540, in response to the received slave device RRC connection setup message communicated at the step 538, the slave device 506 may wait for an enabling signal from the master device 504. As discussed above with respect to FIG. 4, the enabling signal may be used to begin and establish the master/slave connection between the master device 504 and the slave device 506. In some embodiments, the slave device 506 may respond to the enabling signal from the master device 504 and may ignore enabling signals from other master devices based on the indication in the slave assignment information that the master device 504 is designated as the hotspot for the slave device 506.

At a step 542, the slave device 506 may send a slave device RRC connection setup complete message to the access point 502. The RRC connection setup complete message may indicate whether the slave device 506 ever received the enabling signal from the master device 504 and successfully associated with the master device 504 to receive wireless communication services from the master device 504. If the RRC connection message indicates that the slave device 506 did not associate with the master device 504, the access point 502 may re-cluster the wireless devices. In some embodiments, during the re-clustering, the slave device 506 may be reassigned to another master device, re-designated as a master device, or not assigned to another cluster.

Accordingly, the signaling mechanism 500 may be used to establish RRC connections of idle wireless devices to cluster and tether the wireless devices. Additionally, in some embodiments, the signaling mechanism 500 may be utilized with the method 200 to provide the appropriate information for clustering and tethering wireless devices through the method 200.

One skilled in the art will appreciate that, for this and other processes and methods disclosed herein, the functions performed in the processes and methods of the signaling mechanism 500 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the order of operations of the steps described may or may not be performed in the order described above. Additionally, the above description is given with respect to clustering being performed based on a downlink communication initiated by the access point 502. In some instances, the idle wireless devices may initiate an uplink communication with the access point 502. In these instances, the signaling mechanism 500 may begin at the step 522.

Additionally, in some instances when a large number of wireless devices are located within a relatively small venue, a transfer from an idle state to an active connected state by the large number of wireless devices may impose large signaling overhead at access points, which may cause signaling congestion over a random access channel (RACH) within a radio access network (RAN). However, a signaling mechanism that uses network controlled master/slave tethering of wireless devices may reduce the signaling congestion and overhead by having the access points communicate with selected master devices which may then communicate with their associated slave devices.

FIGS. 6A and 6B illustrate an example signaling mechanism 600 for reducing RACH congestion, in accordance with at least some embodiments described herein. In the illustrated embodiment, the signaling mechanism 600 may begin with an access point 602 (substantially similar to the access point 102 described above with respect to FIGS. 1A and 1B) communicating, at a step 620, a temporary master device paging message to wireless devices determined to be temporary master devices. In some embodiments, the temporary master device paging message may also indicate a list of all wireless devices selected as temporary master devices.

At a step 622, the access point 602 may also communicate a temporary slave paging message to one or more wireless devices that may be selected as temporary slave devices. The temporary master devices and temporary slave devices may be any suitable wireless devices such as the wireless devices 104 of FIGS. 1A and 1B.

The access point 602 may select the temporary master and slave devices based on any suitable determination such as the proximity of the temporary slave and master devices to the access point 602. In the illustrated embodiment, the temporary master device paging message is depicted as being communicated to a temporary master device 605 and the temporary slave device paging message is depicted as being communicated to a temporary slave device 607. However, it is understood that the temporary master paging message and temporary slave paging message may also be received by other temporary master and slave devices, respectively.

The temporary slave device paging message may indicate that the temporary slave device 607 has been designated as a temporary slave device. In some embodiments, the temporary slave device paging message may also indicate the list of all wireless devices selected as temporary master devices. Accordingly, the temporary slave device paging message may be configured to wake up the temporary slave device 607 such that, at a step 624, the temporary slave device 607 may begin waiting to receive an enabling signal from a temporary master device to associate with the temporary master device as part of a temporary master device procedure. In some embodiments, the temporary slave device 607 may receive multiple enabling signals from different temporary master devices and may be configured to respond to the enabling signal that may have the highest power.

The temporary master device paging message communicated at the step 620 and received by the temporary master device 605 may indicate that the temporary master device 605 has been designated as a hotspot. Accordingly, the temporary master device paging message may be configured to wake up the temporary master device 605 such that the temporary master device 605 may initiate a random access procedure and the establishment of an RRC connection with the access point (e.g., a cellular base station) as a master device at a step 626.

The random access procedure may include the temporary wireless device 605 communicating a random access preamble to the access point 602 at a step 628; the access point 602 communicating a random access response to the temporary master device 605 at a step 630; and the temporary master device 605 communicating an RRC connection request to the access point 602 at a step 632. At a step 634, the access point 602 may communicate a temporary master device RRC connection setup message to the temporary master device 605.

The temporary master device RRC connection setup message may include an indication that the temporary master device 605 is to serve as a hotspot (similar to the indication in the temporary master device paging message). The temporary master device RRC connection setup message may also include an indication of which wireless devices that may be neighboring the temporary master device 605 may also be designated as temporary master devices.

The temporary master device 605 may initiate the temporary master device procedure at the step 636. As mentioned above, the temporary master device procedure may be initiated such that the temporary master device 605 may temporarily associate with one or more temporary slave devices, such as the temporary slave device 607, through the transmission of an enabling signal. If the temporary slave devices respond to the enabling signal, the temporary master device 605 and responding temporary slave devices may establish an RRC connection between each other so that the temporary slave devices are associated with the temporary master device 605.

At a step 638, the temporary master device 605 may communicate a temporary master device RRC connection setup complete message to the access point 602. The temporary master device RRC connection setup complete message may include elements of a traditional RRC connection setup complete message, but may also include a list of temporary slave devices that associated with the temporary master device 605 during the temporary master device procedure.

At a step 640, the access point 602 may communicate a temporary master device CQI report request to the temporary master device 605. The temporary master device CQI report request may include requests for a CQI report associated with the channel between the temporary master device 605 and the access point 602 and CQI reports associated with the channels between the temporary master device 605 and its associated temporary slave devices. Additionally, in some embodiments, the temporary master device CQI report request may include CQI report requests associated with channels between the temporary master device 605 and other temporary master devices, and/or channels between the temporary slave devices and the access point 602. At a step 642, the temporary master device 605 may communicate a temporary master device CQI report to the access point based on the CQI report request received at the step 640.

At a step 644, the access point 602 may cluster the wireless devices based on the received CQI report. In some embodiments, the access point 602 may cluster the wireless devices based on the method 200 described above with respect to FIG. 2. Following the clustering at the step 644, the access point 602 and temporary master device 605 may reconfigure the RRC configuration between the access point 602 and the temporary master device 605 at a step 646. During the RRC reconfiguration, the temporary master device 605 may be designated to continue to act as a master device, may be designated as a slave device or may not be included in any cluster. In some embodiments, the RRC reconfiguration may be done based on the signaling mechanism 300 described above with respect to FIG. 3.

Following the clustering at the step 644 and as illustrated in FIG. 6B of a continuation of the signaling mechanism 600 of FIG. 6A, the access point 602 may also communicate RRC connection setup messages to master devices and slave devices determined as such in the clustering, but that were not previously designated as temporary master devices.

For example, as indicated in FIG. 6B, the access point 602 may communicate a master device paging message to a master device 604 at a step 648. The access point 602 may also communicate a slave device paging message to a slave device 606 at a step 658. The master device paging message may include master assignment information indicating that the master device 604 is to act as a hotspot to provide wireless communication services for one or more slave devices, such as the slave device 606. The master assignment information may additionally include a list of the slave devices that are designated as slave devices associated with the master device 604. In some embodiments, the master assignment information may also include a list of other wireless devices that may be designated as master devices. The slave device paging message may similarly include slave assignment information. In the illustrated embodiment, the slave assignment information may include an indication that the slave device 606 is to be a slave of the master device 604. In some embodiments, the slave assignment information may also include a list of other wireless devices that may act as master devices.

At a step 650, in response to the master device 604 receiving the master device paging message, the master wireless device 604 and access point 602 may perform a random access and RRC connection establishment procedure at a step 650 to establish an RRC connection between the master device 604 and the access point 602. Additionally, at a step 656, the master device 604 may initiate a master device procedure to attempt to establish a connection with its designated slaves. The master device (or the access point) may also carry out resource allocation to its designated slave devices, such as the slave device 606. In some embodiments, the master device procedure may be performed according to the signaling mechanism 400 described above with respect to FIG. 4.

At a step 656, the master wireless device 604 may communicate a master device RRC connection setup complete message to the access point 602. The master device RRC connection setup complete message may indicate whether the master wireless device 604 accepts or declines to act as the hotspot for its designated slave devices. In some embodiments, the master device 604 may accept or decline to act as a hotspot based on whether channel associations with its designated slaves are successful and/or whether parameter requirements associated with the master device 604 acting as a hotspot are met, such as described above with respect to blocks 204 and 206 of the method 200 of FIG. 2.

Similar to as described above with respect to the signaling mechanism 500, if the RRC connection setup complete message indicates that the master device 604 declines to act as a hotspot, the access point 602 may re-cluster the wireless devices. In some embodiments, the access point 602 may perform the re-clustering as described above with respect to method 200 of FIG. 2. If the RRC connection setup complete message from all master devices indicates that each master device (such as the master device 604) accepts to act as a hotspot, the access point 602 may allocate resource blocks for the master devices (including the master device 604) such as described above with respect to blocks 208 and 210 of method 200 of FIG. 2.

At a step 660, in response to the received slave device RRC connection setup message communicated at the step 658, the slave device 608 may wait for an enabling signal from the master device 604. As discussed above with respect to FIG. 4, the enabling signal may be used to begin and to establish the master/slave connection between the master device 604 and the slave device 606. In some embodiments, the slave device 606 may respond to the enabling signal from the master device 604 and may ignore enabling signals from other master devices based on the indication in the slave assignment information that the master device 604 is designated as the hotspot for the slave device 606.

Accordingly, the signaling mechanism 600 may be used to establish RRC connections of idle wireless devices to cluster and tether the wireless devices in a manner that may reduce RACH congestion. Additionally, in some embodiments, the signaling mechanism 600 may be utilized with the method 200 to provide the appropriate information for clustering and tethering wireless devices through the method 200.

One skilled in the art will appreciate that, for this and other processes and methods disclosed herein, the functions performed in the processes and methods of the signaling mechanism 600 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, the order of operations of the steps described may or may not be performed in the order described above.

Additionally, the above description is given with respect to clustering being performed based on a downlink communication initiated by the access point 602. In some instances, the idle wireless devices may initiate an uplink communication with the access point 602. In some embodiments, the wireless devices may initiate an uplink communication with the access point 602 based on an access class barring (ACB) parameter setting broadcasted by the wireless communication network. In the ACB, an idle wireless device may draw a random number and if the random number is less than the access probability parameter, the idle wireless device may perform the random access procedure to transition to a connected state. Otherwise, the idle wireless device may try again after an access class barring time parameter has passed. In these or other embodiments, the idle wireless devices may be configured to attempt to associate with a master device indicated in the broadcast message carrying the ACB parameters before performing a traditional ACB procedure.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of tethering wireless devices, the method comprising:

assigning, by a wireless communication network access point, a master wireless device as a hotspot to provide communication services for a slave wireless device based on first channel quality information and second channel quality information, the first channel quality information being associated with a first communication channel between the master wireless device and the wireless communication access point and the second channel quality information being associated with a second communication channel between the master wireless device and the slave wireless device; and allocating a wireless communication resource to the master wireless device such that the master wireless device is configured as the hotspot for the slave wireless device, the allocation of the wireless communication resource being based on a determination that a parameter requirement of the wireless communication resource associated with the master wireless device acting as the hotspot for the slave wireless device is met.

2. The method of claim 1, further comprising assigning the master wireless device as the hotspot for the slave wireless device based on a weight associated with the second channel quality information.

3. The method of claim 1, further comprising assigning the master wireless device as the hotspot for the slave wireless device based on a weight associated with the determination that the parameter requirement of the wireless communication resource is met.

4. The method of claim 1, wherein the parameter requirement is associated with the first communication channel.

5. The method of claim 1, wherein the parameter requirement is associated with the second communication channel.

6. The method of claim 1, wherein the parameter requirement is based on a power level associated with wireless communication over a wireless communication resource.

7. The method of claim 1, wherein the parameter requirement is associated with a data rate of at least one of the master wireless device and the slave wireless device.

8. The method of claim 1, wherein the parameter requirement is associated with at least one of a first channel gain of the first channel and a second channel gain of the second channel.

9. The method of claim 1, wherein communications over the second communication channel are based on a frequency band available for general use.

10. The method of claim 1, wherein communications over the second communication channel are based on a frequency band associated with television white spaces.

11. The method of claim 1, further comprising:

organizing a plurality of wireless devices into a cluster, the plurality of wireless devices including the master wireless device and the slave wireless device; and assigning the master wireless device as the hotspot to provide communication services to the slave wireless device and one or more other slave wireless devices of the cluster based on the first channel quality information, the second channel quality information, and other second channel quality information associated with one or more other second communication channels between the master wireless device and the one or more other slave wireless devices.

12. A processor configured to execute computer instructions to cause a system to perform operations for tethering wireless devices, the operations comprising:

assigning, by a wireless communication network access point, a master wireless device as a hotspot to provide communication services for a slave wireless device based on first channel quality information and second channel quality information, the first channel quality information being associated with a first communication channel between the master wireless device and the wireless communication access point and the second channel quality information being associated with a second communication channel between the master wireless device and the slave wireless device; and allocating a wireless communication resource to the master wireless device such that the master wireless device is configured as the hotspot for the slave wireless device, the allocation of the wireless communication resource being based on a determination that a parameter requirement of the wireless communication resource associated with the master wireless device acting as the hotspot for the slave wireless device is met.

13. The processor of claim 12, wherein the operations further comprise assigning the master wireless device as the hotspot for the slave wireless device based on a weight associated with the second channel quality information.

14. The processor of claim 12, wherein the operations further comprise assigning the master wireless device as the hotspot for the slave wireless device based on a weight associated with the determination that the parameter requirement of the wireless communication resource is met.

15. The processor of claim 12, wherein the parameter requirement is associated with the first communication channel.

16. The processor of claim 12, wherein the parameter requirement is associated with the second communication channel.

17. The processor of claim 12, wherein the parameter requirement is based on a power level associated with wireless communication over a wireless communication resource.

18. The processor of claim 12, wherein the parameter requirement is associated with a data rate of at least one of the master wireless device and the slave wireless device.

19. The processor of claim 12, wherein the parameter requirement is associated with at least one of a first channel gain of the first channel and a second channel gain of the second channel.

20. The processor of claim 12, wherein communications over the second communication channel are based on a frequency band available for general use.

21. The processor of claim 12, wherein communications over the second communication channel are based on a frequency band associated with television white spaces.

22. The processor of claim 12, wherein the operations further comprise:

organizing a plurality of wireless devices into a cluster, the plurality of wireless devices including the master wireless device and the slave wireless device; and assigning the master wireless device as the hotspot to provide communication services to the slave wireless device and one or more other slave wireless devices of the cluster based on the first channel quality information, the second channel quality information, and other second channel quality information associated with one or more other second communication channels between the master wireless device and the one or more other slave wireless devices.

23. A method of tethering wireless devices, the method comprising:

organizing a plurality of wireless devices into a cluster;

determining first channel quality information of one or more first communication channels between one or more wireless devices of the cluster and a wireless communication network access point;

determining second channel quality information of one or more second communication channels between one or more pairs of the wireless devices of the cluster;

assigning, by the wireless communication network access point, a master wireless device of the cluster to perform operations as a hotspot to provide communication services for a plurality of slave wireless devices of the cluster based on the first channel quality information and the second channel quality information; and allocating a wireless communication resource to the master wireless device such that the master wireless device is configured as the hotspot for the slave wireless devices, the allocation of the wireless communication resource being based on a determination that a parameter requirement of the wireless communication resource associated with the master wireless device performing operations as the hotspot for the slave wireless devices is met.

* * * * *